(12) United States Patent
Krishnarajah et al.

(10) Patent No.: US 7,145,919 B2
(45) Date of Patent: Dec. 5, 2006

(54) METHOD AND APPARATUS FOR TRANSPORTING DIFFERENT CLASSES OF DATA BITS IN A PAYLOAD OVER A RADIO INTERFACE

(75) Inventors: Ainkaran Krishnarajah, Stockholm (SE); Hesham Soliman, Victoria (AU)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 1005 days.

(21) Appl. No.: 10/092,720

(22) Filed: Mar. 8, 2002

(65) Prior Publication Data

US 2003/0081592 A1 May 1, 2003

Related U.S. Application Data

(60) Provisional application No. 60/294,575, filed on Jun. 1, 2001.

(51) Int. Cl.
*H04J 3/24* (2006.01)
(52) U.S. Cl. .................... 370/474; 370/469
(58) Field of Classification Search ............ 370/351, 370/419, 474, 476, 389, 469, 473
See application file for complete search history.

(56) References Cited

U.S. PATENT DOCUMENTS 5,249,185 A * 9/1993 Kanno et al. ............ 370/465
5,550,593 A * 8/1996 Nakabayashi ............ 348/465
5,717,689 A * 2/1998 Ayanoglu ............ 370/349
5,956,320 A * 9/1999 Sato ............ 370/229

FOREIGN PATENT DOCUMENTS

| GB | 2341059 | 3/2000 |
|---|---|---|
| WO | WO 00/10334 | 2/2000 |
| WO | WO 00/42743 | 7/2000 |
| WO | WO 0042789 | 7/2000 |
| WO | WO 02/19619 | 3/2002 |

OTHER PUBLICATIONS

International Preliminary Examination Report PCT/SE02/01065.

* cited by examiner

*Primary Examiner*—Chau Nguyen
*Assistant Examiner*—Kerri M. Rose
(74) *Attorney, Agent, or Firm*—Nixon & Vanderhye P.C.

(57) ABSTRACT

Different bits in a payload of data to be transmitted from a sending application receive different classes of treatment. The payload data is divided into a first group of bits associated with a first treatment class and a second group of bits associated with a second treatment class. A first packet is created which includes the first group of bits and a first header that identifies the first packet with the first treatment class. A second packet is created that includes the second group of bits and second header that identifies the second packet with the second treatment class. Using the first header, the first packet is mapped to a first bearer that is configured to support the first treatment class. Using the second header, the second packet is mapped to a second bearer configured to support the second treatment class.

39 Claims, 14 Drawing Sheets

IPv6 Header Format

METHOD AND APPARATUS FOR TRANSPORTING DIFFERENT CLASSES OF DATA BITS IN A PAYLOAD OVER A RADIO INTERFACE

RELATED APPLICATIONS

This application claims priority from commonly-assigned U.S. Provisional Patent Application Ser. No. 60/294,575, filed Jun. 1, 2001, the entire content of which is incorporated herein by reference.

FIELD OF THE INVENTION

The present invention relates to data communications over a radio interface, and more particularly, to transporting different classes of payload data over the radio interface.

BACKGROUND AND SUMMARY

Many radio communications systems that support packet data communications including, for example, Universal Mobile Telephony Systems (UMTS), incorporate some type of quality of service (QoS) into data traffic handling. In other words, certain types of data traffic have priority over other types. While data networks traditionally provide "best effort" service, some data applications require a higher quality of service than best effort. Examples of such applications include real-time data applications (IP telephony and videoconferencing), streaming data services (audio or video), or high quality data services (browsing with bounded download delays). When defining different quality of service classes or traffic classes in a mobile radio communications system, restrictions and limitations associated with the radio interface must be taken into account. For example, it is not advantageous to define complex QoS mechanisms, (as have been defined in fixed networks), because of the different and more difficult error characteristics of the radio interface.

In UMTS, there are four quality of service data classes including: a conversational class, a streaming class, an interactive class, and a background class. The main distinguishing factor between these quality of service classes is the delay sensitivity of the traffic. The conversational class is meant for very delay sensitive traffic, while the background class is the most delay insensitive traffic class. Conversational and streaming classes may be used to carry real-time traffic flows associated with conversational services. The interactive and background classes are mainly used by traditional Internet applications like web browsing, e-mail, etc. Because traffic in the interactive class has a higher priority than the priority of a background class of traffic, background applications use transmission resources only when interactive applications do not need them. This is particularly important in a radio environment where bandwidth resources are scarce compared to fixed networks.

When transmitting voice over an IP network, speech is digitally-encoded at the sending end and decoded at the receiving end. The devices which perform these speech coding and decoding operations are referred to as CODECs (COder-DECoders). While there are many techniques for speech coding, and therefore many different types of CODECs, some CODECs can be operated at different rates. For example, the GSM Adaptive Multi-Rate (AMR) CODEC, defined in GSM Specification 06.90, is a multi-mode CODEC that can operate in any of eight different modes with bit rates from 4.75 kbps to 12.2 kbps. The coder can change any of its modes in response to channel conditions and offers discontinuous transmission support such that the lowest bit rate appropriate under the circumstances is used and the bandwidth consumed during silent periods is reduced. An AMR CODEC is the coding choice for many third generation wireless systems like UMTS for this reason.

CODECs, such as AMR CODECs, provide a frame or "payload" of data that may carry different types or classes of data. Typically, the entire payload of data is treated the same as one traffic class. However, a "higher class" of payload data carrying high priority data should receive priority treatment, such as a higher quality of service or a higher degree of error protection. On the other hand, a lower class of data should receive a lower priority treatment such as a lower quality of service, a lower error protection, or no error protection at all. Thus, different parts of the coder payload should be handled differently. Therefore, if a higher traffic class is adopted for the entire payload, it is "wasted" on the lower priority data. Conversely, if a lower traffic class is adopted, the higher priority data is not serviced properly.

An objective of the present invention is to provide different services or treatments (such as different quality of service or error protection) to different portions of a payload. By treating different bits in a payload differently, the most important bits or the higher priority bits should be treated better, and therefore receive more resources, than less important or lower priority bits. In this way, differentiated services could be provided at the frame/payload level, which is an important feature in a system that provides multi-media services. Another objective is to provide differentiated treatment in away that uses the scarce radio bandwidth more efficiently, which is very important in radio communications systems. A further objective is to implement "unequal treatment" of payload data so that the architectural principles of wireless networks like UMTS and the Internet Protocol are preserved.

The present invention meets these and other objectives. Different bits in a payload of data may be transmitted from a sending application using different classes of treatment. The payload of data is divided into a first group of bits associated with a first treatment class and a second group of bits associated with a second treatment class. A first packet is created which includes the first group of bits as well as a first header that identifies the first packet with the first treatment class. Similarly, a second packet is created that includes the second group of bits and second header that identifies the second packet with the second treatment class. The first packet is mapped to a first communications bearer, e.g., a radio bearer, configured to support the first treatment class using the first header. Similarly, the second packet is mapped to a second communications bearer configured to support the second treatment class using the second header.

In different example embodiments or implementations, the payload dividing operation may occur at an application processing layer or it may occur at an Internet Protocol (IP) processing layer. Since the first and second communications bearers are configured to support different treatment classes, (such as different qualities of service, different error protection schemes, etc.), different bits in the payload receive different treatment over the radio interface. Moreover, the first and second headers include information that permits a receiver to reassemble the payload with the first and second packets in a correct sequence. If an error correction scheme is identified in the header of either the first or second packets, the receiver is also able to implement that error correction scheme to correct any errors in the first or second packets.

Different types of headers may be used. For example, existing Internet protocol headers may be employed, and the mapping of a packet to a corresponding communications bearer may be determined using a standard IP header field. A specific, non-limiting, example embodiment is described below where the first and second IP packets are IP version 6 (IPv6) packets, and the mapping of each packet to a corresponding communications bearer is determined using the flow label of the IP header.

Alternatively, the mapping of each packet to a corresponding communications bearer may be determined using a combination of source and destination addresses, a transport layer protocol, and/or a port number in the packet's header. Another example application is to Real-time Transport Protocol (RTP) packets. First and second headers are RTP headers which include an RTP extension indicating one of the treatment classes. Accordingly, the mapping of an RTP packet to a corresponding communications bearer is determined using the RTP extension of the RTP packet.

The first and second IP headers alternatively may each include a destination option field. In this case, the mapping of each packet to a corresponding communications bearer is determined using the destination option of the packet.

Because it is important to conserve bandwidth and because breaking up a payload of data typically results in smaller packets, it is advantageous (but not necessary) to compress each packet header.

A non-limiting, example application of the present invention is described below which provides different levels of error protection in a UMTS-type communications system.

BRIEF DESCRIPTION OF THE DRAWINGS

The foregoing and other objects, features, and advantages of the present invention may be more readily understood with reference to the following description taken in conjunction with the accompanying drawings.

DETAILED DESCRIPTION

In the following description, for purposes of explanation and not limitation, specific details are set forth, such as particular embodiments, procedures, techniques, etc. in order to provide a thorough understanding of the present invention. However, it will be apparent to one skilled in the art that the present invention may be practiced in other embodiments that depart from these specific details. For example, while the present invention is described in places below in the context of an example application to a UMTS system, the present invention may be employed in any system (wired or wireless) that offers multimedia services.

In some instances, detailed descriptions of well-known methods, interfaces, devices, and signaling techniques are omitted so as not to obscure the description of the present invention with unnecessary detail. Moreover, individual function blocks are shown in some of the figures. Those skilled in the art will appreciate that the functions may be implemented using individual hardware circuits, using software functioning in conjunction with a suitably programmed digital microprocessor or general purpose computer, using an application specific integrated circuit (ASIC), and/or using one or more digital signal processors DSPs).

Figure 1:
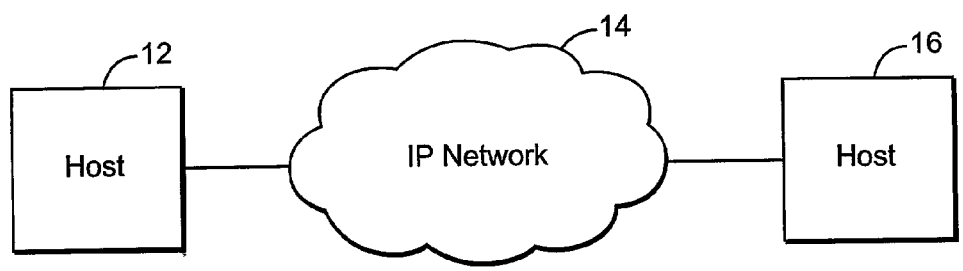
FIG. 1 illustrates a data communications network in which the present invention may be used.

FIG. 1 illustrates a data communications system 10 in which the present invention may be employed. A sending host 12 is coupled to an Internet Protocol (IP) network 14. The IP network 14 receives packets from the host 12 and routes them to a receiving host 16. Each host includes an application program that provides the interface for a host user to access a particular IP service. Each host may be, for example, a desktop or laptop computer. An example application is a conferencing application program used to attend an IP network-based meeting, where the participants of the meeting collaborate using various programs. User applications may access IP network services through an application programming interface (API). An API provides application programmers with a uniform interface to access underlying system resources. For instance, an API may be used to configure a network resource manager to require that a particular IP packet originating from a given application receive a certain treatment from the network, such as a particular quality of service. Each of the hosts 12 and 16 may be a wireline host or wireless host.

Figure 2:
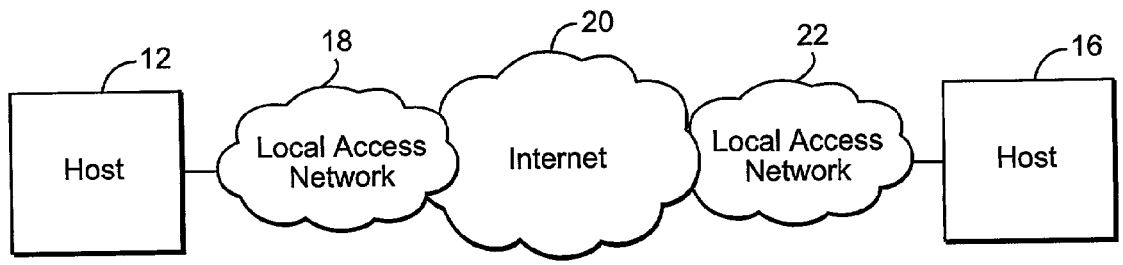
FIG. 2 illustrates another data communications system in which the present invention may be used.

FIG. 2 illustrates in further detail a communications network. The sending host is coupled to the Internet 20 through a local access network 18. Similarly, the receiving host 16 is coupled to the Internet 20 through its own local access network 22. If the hosts are wireless, the local access network may include, for example, a GPRS-type or UMTS-type of local access network.

Figure 3:
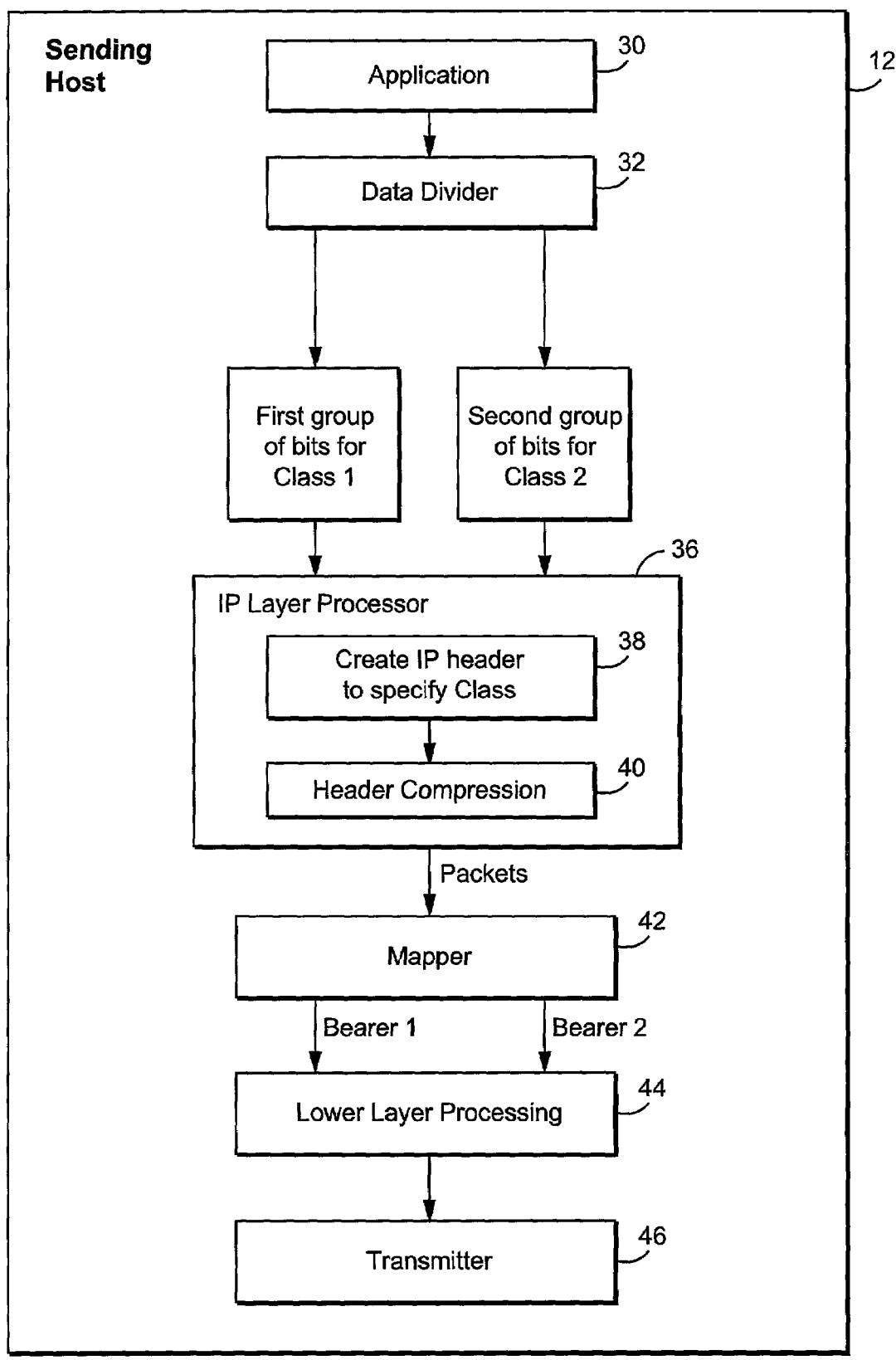
FIG. 3 illustrates a sending host in function block form.

The sending host 12 is illustrated in function block diagram format in FIG. 3. An application program 30 provides application data in the form of data frames or data payloads to an application divider 32. Each data frame or data payload is divided or "fragmented" into different groups of bits based on the different classes of bits included in the data frame/payload. In this simple example, each data frame/payload includes two different categories or classes of bits which are to be treated differently. Accordingly, the first group of payload bits in treatment class 1 is provided by a data divider 32 to the IP layer processing block 36. The IP layer processor 36 creates a packet for the first group of bits for class 1 as well as a corresponding header that identifies this packet with the first treatment class 38. Similarly, the data divider 36 provides the second group of bits corresponding to the second treatment class to the IP layer processor 36. The IP layer processor 36 creates a second packet with its corresponding IP header associating that packet with the second treatment class 38.

Because the payload is split, the two packets are smaller than a single packet carrying the entire payload. Packet size typically decreases as the number of different treatment classes increases. Because every packet requires a header, the overhead "cost" of sending smaller packets is higher than for larger packets, (ignoring retransmission "costs" for corrupted packets and other costs). In order to reduce the amount of radio bandwidth that will be necessary to transmit headers associated with smaller packets, header compression is preferably, (though optionally), employed as indicated in block 40. Non-Any appropriate compression algorithm may be employed. Non-limiting examples are found in IETF RFC 2507 and IETF RFC 3095.

The first and second packets are delivered to a mapper 42 which, based upon the IP header of each packet, maps each packet to an appropriate communications bearer. Bearer 1 is configured in accordance with a first packet treatment class, which might include a first quality of service, a first error protection scheme, (or no error protection), etc. Bearer 2 is configured to support a second treatment class, such as a second quality of service, a second error protection scheme, (or no error protection), etc. Thus, packet 1 is mapped to communications bearer 1, and packet 2 is mapped to bearer 2 for transport. The stream of packets on the first and second bearers are further processed in lower layer processing 44 and then transmitted over a communications channel via transmitter 46.

Figure 4:
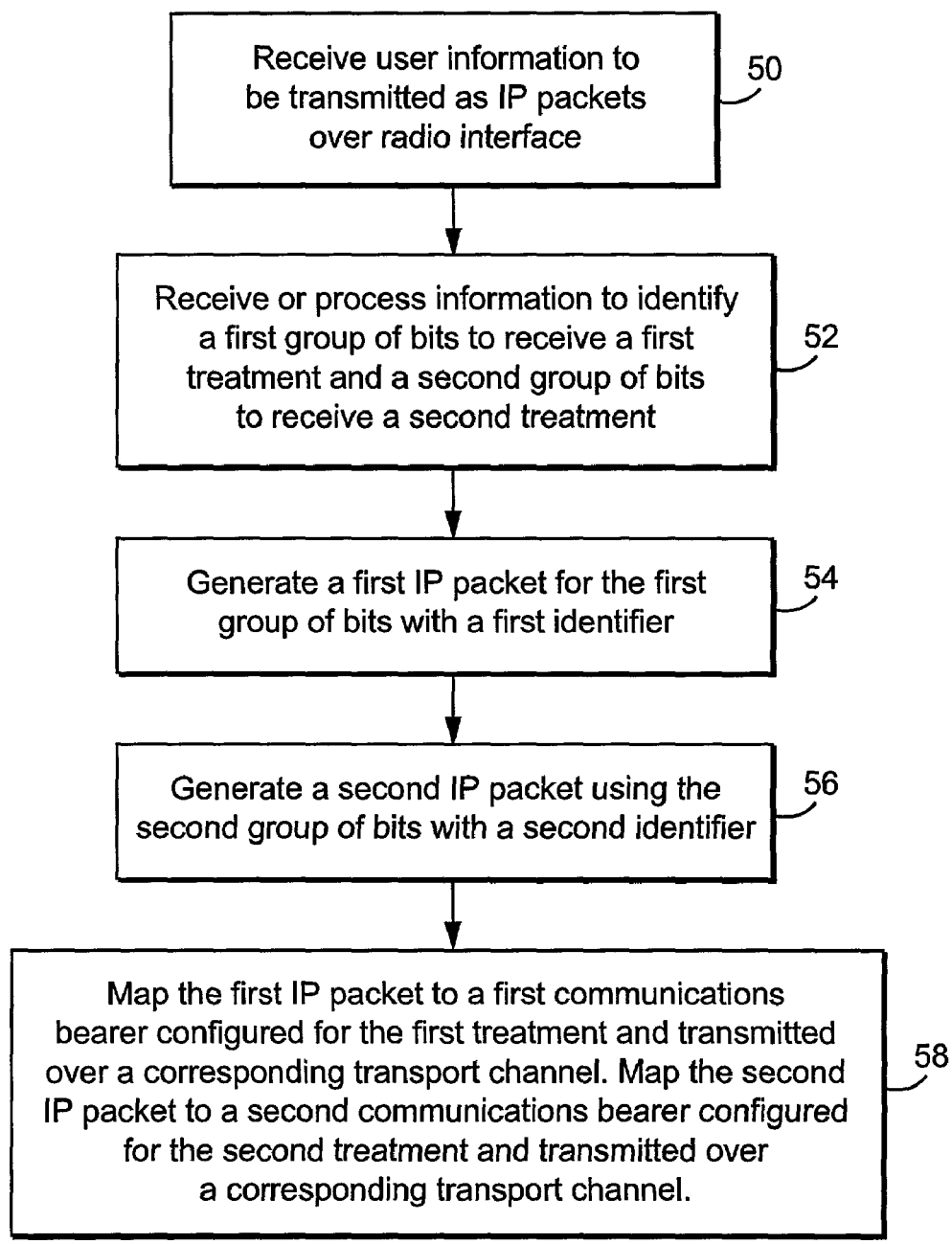
FIG. 4 illustrates example, non-limiting procedures in flowchart form that may be implemented by the sending host of FIG. 3.

FIG. 4 illustrates in flowchart form example procedures which may be implemented by the sending host 12. Initially, user information from an application is received, for example, in the form of a data frame or a data payload, to be transmitted as IP packets over a radio interface (block 50). This information is received and processed to identify a first group of bits to receive a first treatment and a second group of bits to receive a second treatment (block 52). A first IP packet is generated for the first group of bits with a first identifier which associates the first IP packet with the first treatment (block 54). A second packet is generated using the second group of bits and a second identifier that identifies the second packet with the second treatment (block 56). The first IP packet is mapped to a first communications bearer (i.e., a logical channel) configured for the first treatment and transmitted over a corresponding transport channel. The second IP packet is mapped to a second communications bearer configured for the second treatment and transmitted over a corresponding transport channel (block 58).

Figure 5:
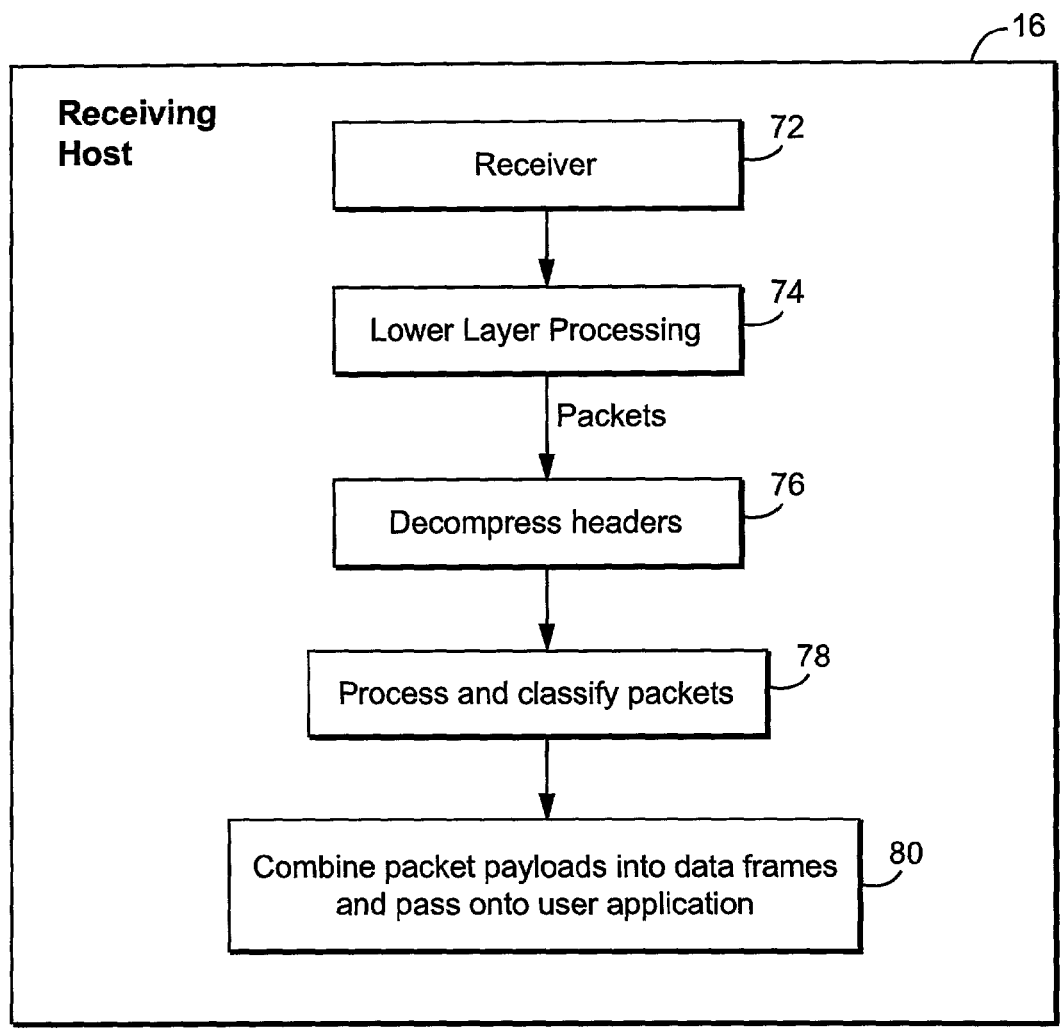
FIG. 5 is a function block diagram of a receiving host.

Receiving host 16 is shown in function block format in FIG. 5. A receiver 72 receives information over a communications channel and provides it to lower layer protocol processing 74 which produces packets. A decompressor 76 decompresses the headers for each packet if header compression was employed by the sender. A packet processor 78 processes and classifies packets. Based upon the identifying information in the packet headers, a packet combiner 80 combines the packet payloads into data frames and passed on to the user application in the receiving host.

Figure 6:
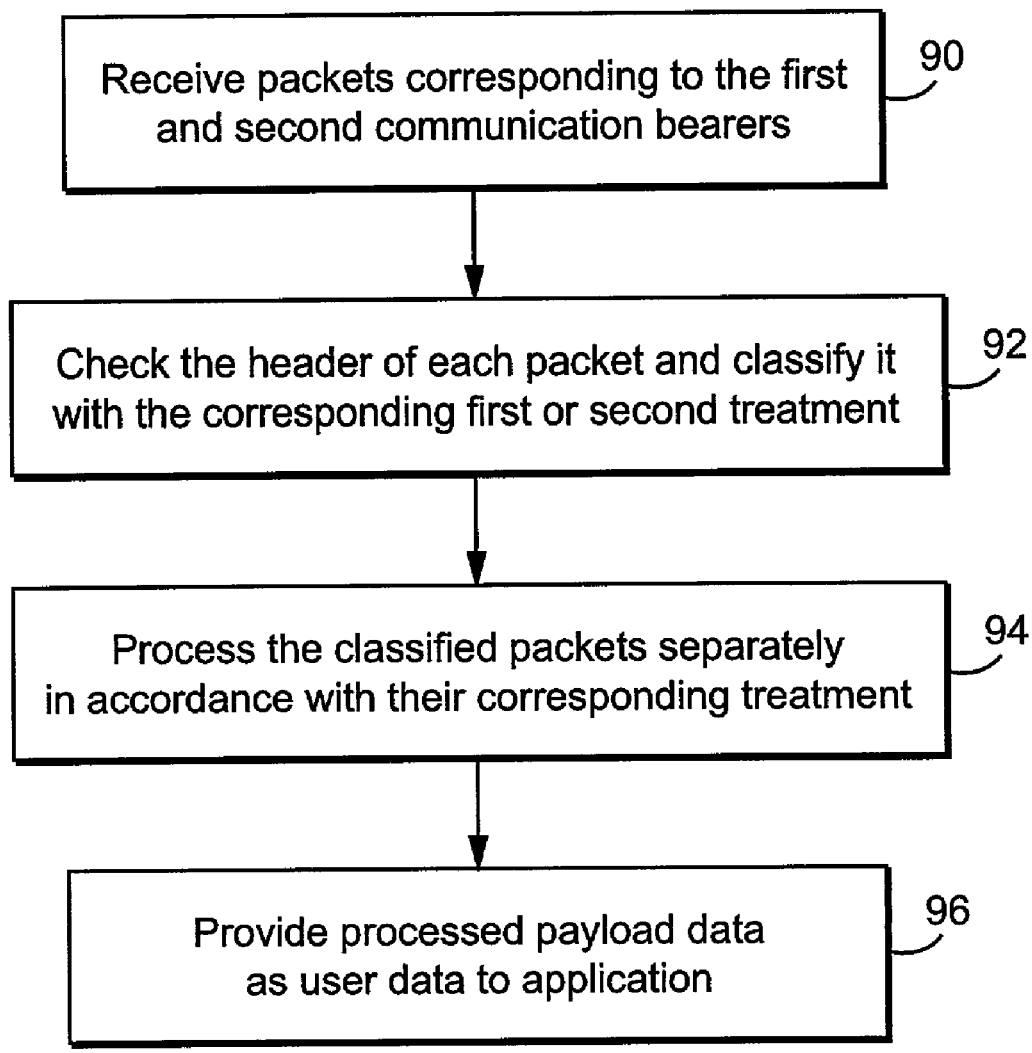
FIG. 6 illustrates example, non-limiting procedures in flowchart form that may be implemented by the receiving host of FIG. 5.

FIG. 6 illustrates example procedures performed by the receiving host 16. Packets are received over a communications channel corresponding to the first and second communication bearers (block 90). The headers of each packet are checked and classified to identify treatment of each packet (block 92). The classified packets are processed separately in accordance with their corresponding treatment, e.g., error detection and/or correction may be applied to those bits in packets which receive certain error protection treatment (block 94). The packet bits are combined into data payloads or frames and then provided as user data to an application in the receiving host (block 96).

In the examples provided above, the dividing of each data frame or payload into different groups or classes of bits may occur in the application layer or in a lower layer, such as the IP layer. In application layer fragmentation/division, the application divides each payload of user data into different smaller payloads corresponding to different treatment classes and provides those smaller payload fragments to an application program interface (API). The API passes the fragments and corresponding treatment information to the IP layer. The IP layer generates the IP packets along with corresponding treatment information mapped into the packet header. The packet header also preferably includes information regarding the sequence number of packets sent within the payload to ensure that the information is delivered to the remote host so that the packets can be put in a correct order to reconstruct the payload containing different classes of data.

Alternatively, the different classes of bits in a payload/data frame may be split at the IP layer. The payload is passed from the application to the IP layer as a single data block along with information that identifies how many parts this single data block should be split into, the size of each part, and perhaps other additional information). Thus, the application requests via the IP that the API layer fragment the packets add an extension header to each packet. As instructed, the IP Layer accordingly fragments that single data block into several IP packets, each packet containing bits of a different class or treatment along with an appropriate header indicating the associated treatment/class. The additional treatment information in each IP header is used by the receiver in reconstructing the single data block from the fragments. In the former approach, the IP layer is not aware that fragmentation occurs. In the latter approach, the IP layer is aware that fragmentation occurs, but it simply follows the application's request. In both approaches, the fragmentation decision is made by the application.

IP packets need to be transmitted on communication bearers (i.e., logical channels) that are configured to accommodate, support, or deliver the treatment or requirements of the particular packets. Different mechanisms currently available in existing IP headers may be used to identify each packet and its treatment and map each packet to an IP data "flow" which is associated with a unique stream of IP packets transported between two peer entities via some application. Such a unique stream maybe identified by such things as source end (Party A) and destination end (Party B) IP addresses and source end and destination end UDP ports numbers which define the application. The IP packets are transported by logical bearers, and the packet treatment defines how the stream is transported across the bearer.

One example mechanism is to use an Internet Protocol version 6 (IPv6) flow label in the IPv6 header to identify an appropriate flow for a packet based on its end-to-end uniqueness. A flow is typically part of the IP stream between source and destination. Each flow corresponds to a treatment, and the treatment essentially defines the flow. Thus, a flow label is reserved for each treatment class. When application layer fragmentation is employed, the application provides a flow label for each treatment class for each packet via the application programming interface (API). The flow label value in each IP packet identifies the data carried in the packet, as well as its corresponding treatment, and is used to map the packet to that flow's bearer. At the receiving host, the API informs the application of the received class/treatment based on the flow label in the received IP packet. If IP layer payload fragmentation is used, the application provides the necessary information to allow the IP stack to fragment the payload appropriately and assign the necessary treatment values for the IPv6 flow label.

IPv6 also allows a sending host to send treatment/class information to a receiving host as a destination option. The host at the destination understands from the destination option how to handle the flow, i.e., how to reconstitute the original data from the fragments received. A destination option provides information necessary for a receiving host to identify a flow and can be defined per application using a "TYPE" field in the destination option. Alternatively, the "TYPE" field can be used to define a certain category of applications, and a separate sub-option can be used per application. The information received in the destination option is forwarded to the application in the receiving host via the API.

Another example mechanism to map each packet to a corresponding flow/bearer so it receives the treatment is to use a combination of one or more of the source and destination addresses, transport layer protocol, and port numbers to identify the packet with a particular flow. This information can be provided in the IP header (see, e.g., FIG. 14) and/or the UDP header (see, e.g., the RFC 768). If an application is running real-time services, it may be that the combination of address and port numbers is not a sufficient identification of a flow. In this situation, the flow identification information may be encoded into a Real Time Protocol (RTP) header.

Figure 7:
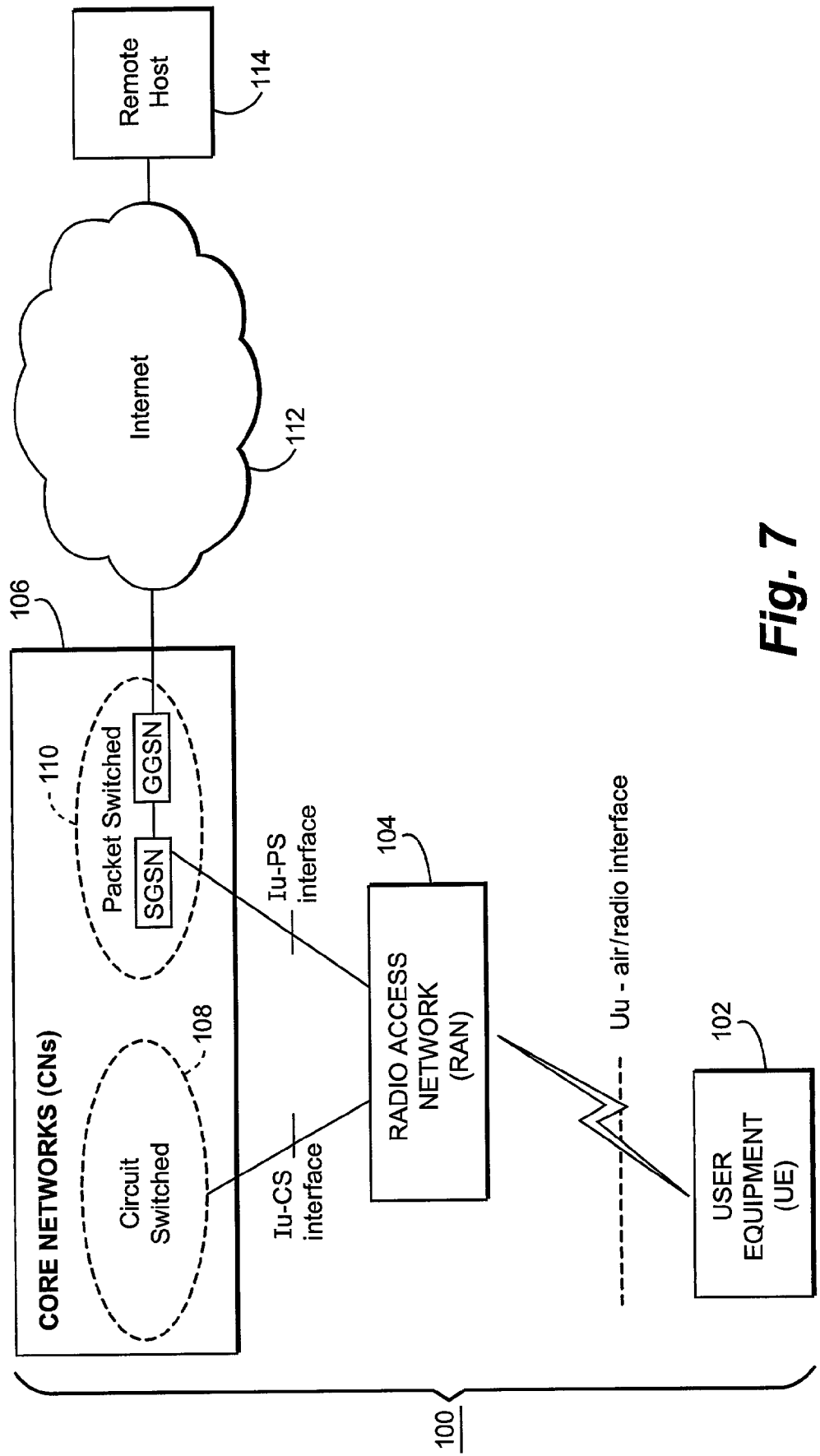
FIG. 7 illustrates an example UMTS.

Thus, the present invention permits different bits in a payload or frame of data to be handled differently, and therefore receive different treatments or services. High priority, high quality of service, and/or important bits are identified and appropriately handled without having to treat all of the data in a payload using a higher treatment class which is expensive in terms of necessary resources. In addition, the present invention can be implemented very simply using existing provisions in traditional IP communications. Another advantage is that unequal error protection can be employed in a way that is transparent to routers and intermediate nodes so forwarding speed/performance is not impacted. An example, non-limiting implementation is now described in the context of a UMTS environment. A typical UMTS system 100 is shown in FIG. 7 and includes a wireless user equipment (UE) 102 which communicates over an air/radio interface (Uu) with a radio access network (RAN) 104. The radio access network communicates over an appropriate interface with one or more core networks (CNs) 106. For example, the radio access network 104 communicates with a circuit-switched core network 108 over an lu-CS interface. The radio access network 104 communicates with a packet-switched core network 110 over an lu-PS interface. The packet-switched network 110 is a GPRS network and includes at least one SGSN node coupled to a GGSN node which functions as a gatekeeper to the Internet 112 coupled to a remote host 114.

There can be several different radio access networks (RANs) that can communicate with the core network. For example, the UMTS architecture may include a UMTS-type core network and a UMTS-type RAN, the latter of which is known as the UMTS Terrestrial Radio Access Network A. UMTS evolved from the General Packet Radio Service (GPRS), which itself evolved from the Global System for Mobile communication (GSM). Another type of radio access network is based on the evolution from GSM to the Enhanced Data rates for GSM Evolution (EDGE). This is more formally referred to as GSM/EDGE Radio Access Network (GERAN).

Figure 8:
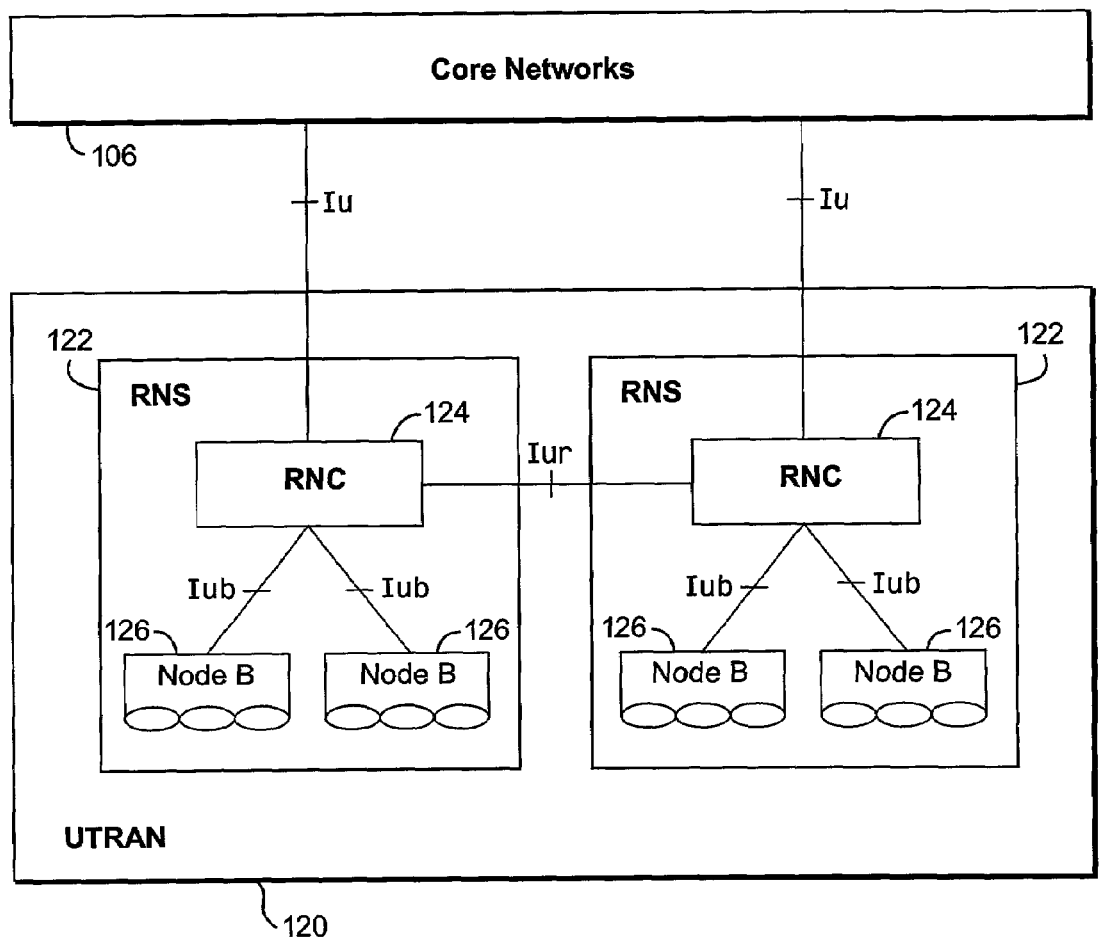
FIG. 8 illustrates a radio access network that may be used in the UMTS shown in FIG. 7.

FIG. 8 shows a UTRAN 120 which includes a radio network system 122. Each radio network system 122 includes one or more radio network controllers 124 which communicate with each other over an Iur interface. Each radio network controller 124 is coupled to one or more node Bs 126 over an Iub interface. Node B's are sometimes referred to as radio base stations. The node B's service one or more geographical cell areas and provide the radio transceiving and signal processing equipment to communicate with the user equipment 102 over the radio interface.

Figure 9:
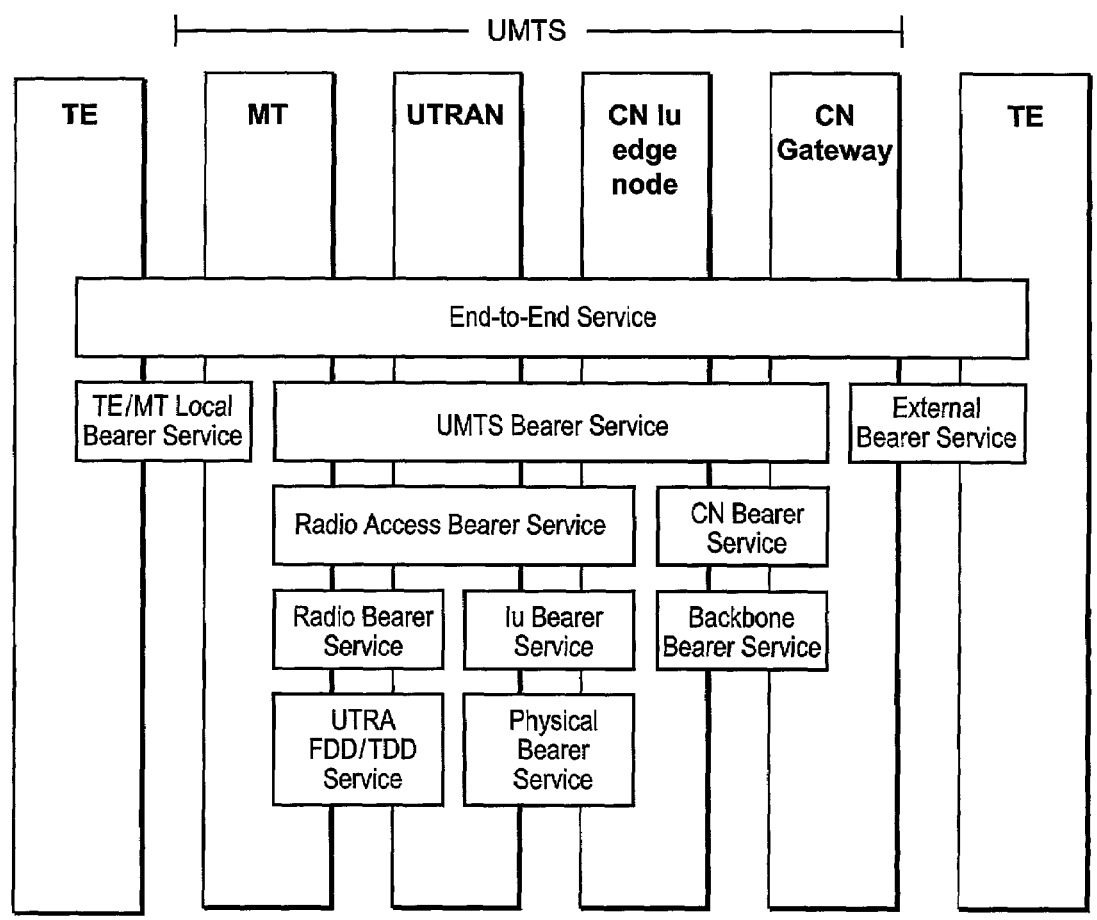
FIG. 9 illustrates a bearer architecture in the UMTS system of FIG. 6.

FIG. 9 illustrates the UMTS "bearer" model for delivering network services. Again, a bearer is a logical channel. In UMTS, network services are considered to be "end-to-end," i.e., from one terminal equipment (TE) to another terminal equipment. The terminal equipment, such as a laptop, may be coupled to a mobile terminal (MT) either in separate devices or in integrated devices. Together, they are referred to as the user equipment (UE). An end-to-end service may have a certain quality of service (QoS) provided for the user of a network service. To realize a certain network quality of service, a bearer with clearly defined characteristics and functionality must be set up from the source to the destination of the service. A bearer service includes all aspects needed to enable the provision of a contracted quality of service. These aspects include, among others, control signaling, user plane transport, and quality of service management functionality. The UMTS bearer service is a layered architecture as depicted in FIG. 9, and each bearer service at a specific layer offers its individual services to higher layers using services provided by lower layers. At the physical layer, the term UTRA corresponds to UMTS Terrestrial Radio Access, FDD to Frequency Division Duplex, and TDD to Time Division Duplex. Further information relating to UMTS bearers can be found in 3GPP TS 23.107.

Figure 10:
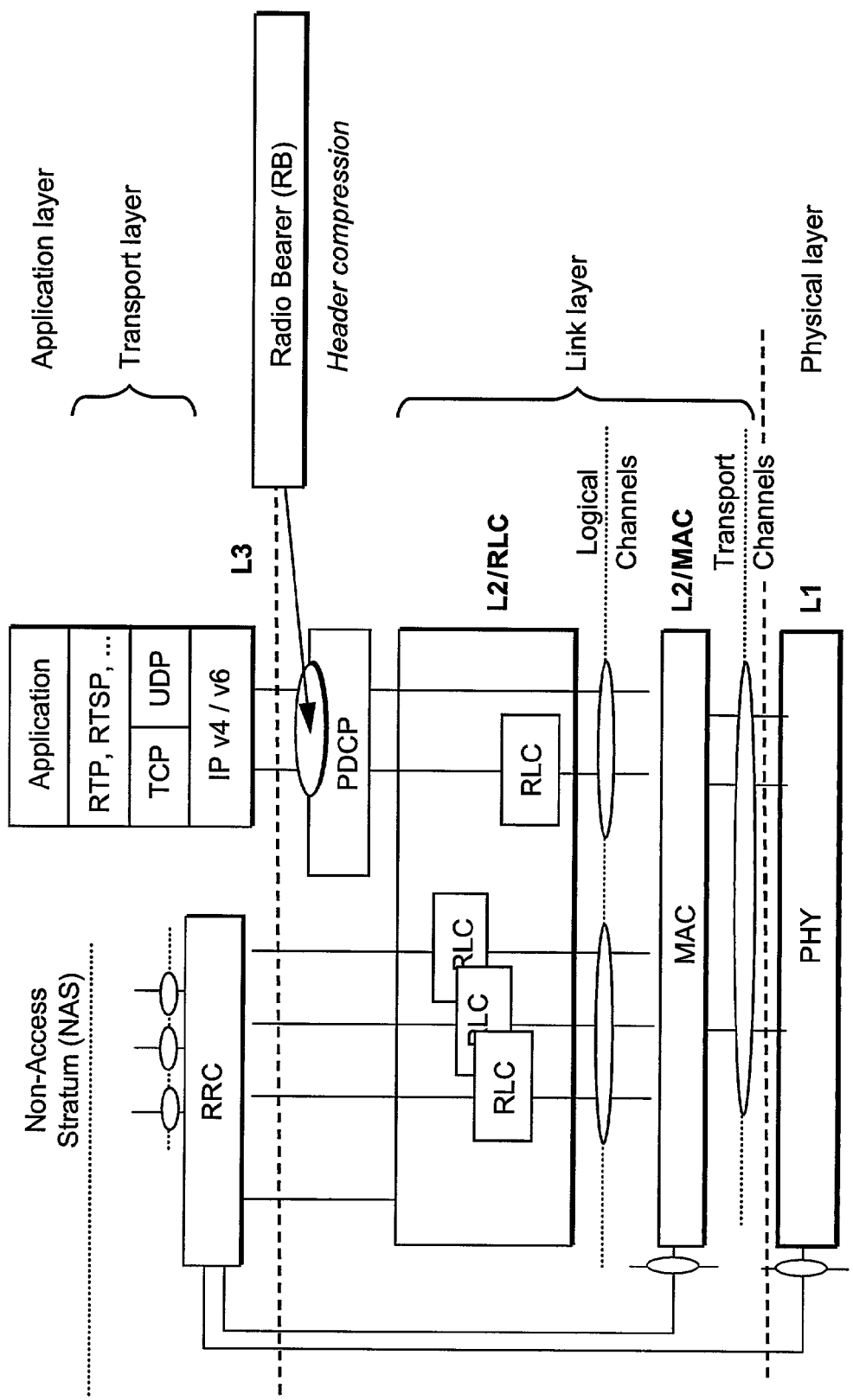
FIG. 10 illustrates a radio access network radio protocol architecture for use in the UMTS system of FIG. 6.

The radio protocol architecture for UTRAN is illustrated in FIG. 10 (refer to 3GPP TS 25.301). The left side of the protocol stack corresponding to the radio resource control (RRC) and below, indicated as non-access stratum (NAS), represents the control plane (signaling). The right side of the protocol stack represents the user plane (user traffic). Referring to the user plane, an application layer rests on a transport layer which is serviced in this example by the real-time transport protocol (RTP), the RTP control protocol (RTSP), etc., which rests upon the traditional transport protocols, the transmission control protocol (TCP), and the user datagram protocol (UDP). The network layer is the Internet Protocol (P) layer which can be any version including IP version 4 and IP version 6. The packets generated at the IP layer are then mapped to radio bearers in the link layer corresponding to logical channels. Header compression of packets, described further below, may occur here. The radio link control and media access control (MAC) map the radio bearers onto transport channels provided to the physical layer which sends the packets over the radio interface.

Figure 11:
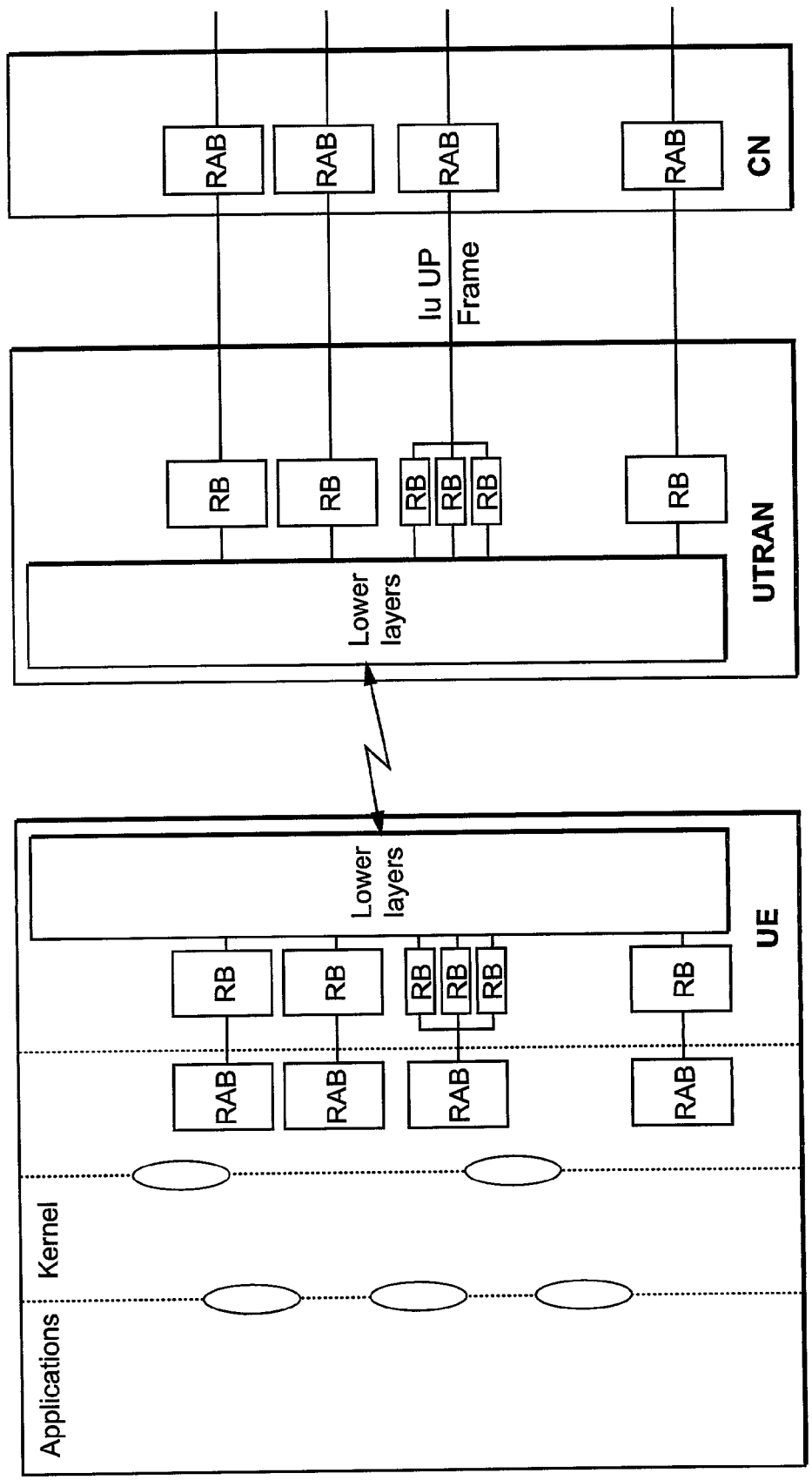
FIG. 11 illustrates a relationship between radio access bearers (RABs) and radio bearers (RBs) in the UMTS of FIG. 6.

A radio bearer (RB) is a service that the UTRAN offers the radio access bearer (RAB). The relationship between RABs and RBs is illustrated in FIG. 11. The kernel shown between the application and the RABs is the operating system software. An RAB can be split into several parts or subflows, with each subflow associated with a different radio bearer. An RAB subflow is associated with a radio bearer, a QoS class or treatment, and a fragmented payload. The decision to have a radio access bearer with one or more subflows is made during quality of service negotiation. Each subflow may have different quality of service requirements/ characteristics or treatment. The core network indicates, in the Iu user plane frame protocol, a number and size of subflow to the RNC in the UTRAN. The RNC splits the Iu user plane frame into various subflows and directs the traffic to the appropriate radio bearer. Examples of different qualities of service available in the UMTS are set forth in Table 1 and Table 2 shown below.

type and frame quality indicator fields. The AMR auxiliary information includes mode indication, mode request, and CODEC CRC fields. The AMR core frame includes speech parameter bits, or in the case of a comfort noise frame, comfort noise parameter bits. In the case of a speech frame, the Class A, B, and C bits carry speech parameters and speech sample information. In the case of a comfort noise frame, the comfort noise parameters replace the Class A bits,

TABLE 1

UMTS QoS classes

|  | Conversational class conversational RT | Streaming class streaming RT | Interactive class Interactive best effort | Background Background best effort |
|---|---|---|---|---|
| Fundamental characteristics | Preserve time relation (variation) between information entities of the stream Conversational pattern (stringent and low delay) | Preserve time relation (variation) between information entities of the stream | Request response pattern Preserve payload content | Destination is not expecting the data within a certain time Preserve a payload content |
| Example of application | voice | streaming video | Web browsing | background download of e-mails |

TABLE 2

Radio Access Bearer attributes defined for each bearer traffic class

| Traffic class | Conversational class | Streaming class | Interactive class | Background class |
|---|---|---|---|---|
| Maximum bitrate | X | X | X | X |
| Delivery order | X | X | X | X |
| Maximum SDU size | X | X | X | X |
| SDU format information | X | X | | |
| SDU error ratio | X | X | X | X |
| Residual bit error ratio | X | X | X | X |
| Delivery of erroneous SDUs | X | X | X | X |
| Transfer delay | X | X | | |
| Guaranteed bit rate | X | X | | |
| Traffic handling priority | | | X | |
| Allocation/ Retention priority | X | X | X | X |
| Source statistics descriptor | X | X | | |

UMTS also employs adaptive multi-rate (AMR) speech coding and decoding. An AMR speech coder includes a multi-rate speech coder, a source control rate mechanism with a voice activity detector and a comfort noise generator, and an error correction mechanism to compensate for transmission errors and lost packets. The multi-rate speech coder is a single integrated speech CODEC with eight source rates from 4.75 kbps to 12.2 kbps, and a low rate background noise encoding mode. The speech coder can switch its bit rate every 20 millisecond speech frame on command.

Figure 12:
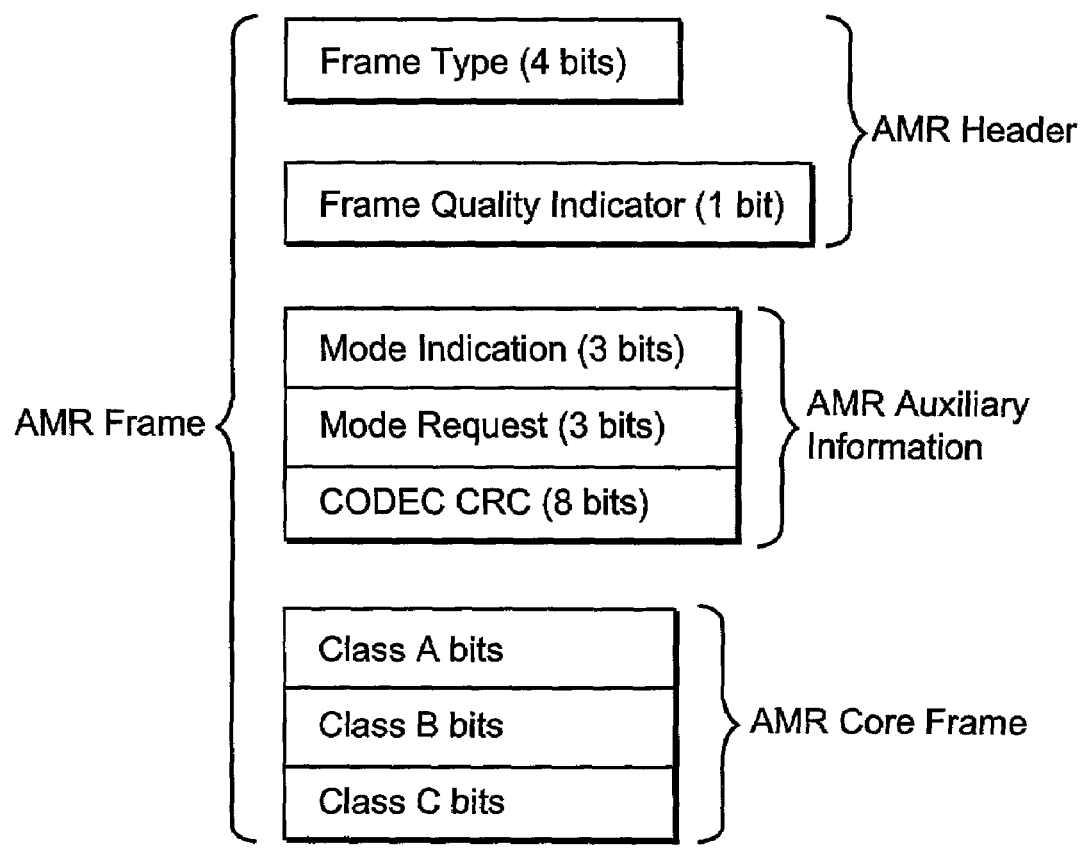
FIG. 12 illustrates an example adaptive multi-rate frame.

FIG. 12 illustrates an AMR frame structure divided into three parts: a AMR header, AMR auxiliary information, and an AMR core frame. The AMR header includes the frame and the Class B and C bits are omitted. Table 3 below illustrates the sizes of the three different classes and their relation to the different AMR nodes.

TABLE 3

Number of bits in Classes A, B, and C for each AMR CODEC mode

| Frame Type Index | AMR CODEC mode | Total number of bits | Class A | Class B | Class C |
|---|---|---|---|---|---|
| 0 | 4.75 | 95 | 42 | 53 | 0 |
| 1 | 5.15 | 103 | 49 | 54 | 0 |
| 2 | 5.90 | 118 | 55 | 63 | 0 |
| 3 | 6.70 | 134 | 58 | 76 | 0 |
| 4 | 7.40 | 148 | 61 | 87 | 0 |
| 5 | 7.95 | 159 | 75 | 84 | 0 |
| 6 | 10.2 | 204 | 65 | 99 | 40 |
| 7 | 12.2 | 244 | 81 | 103 | 60 |

In one scheme, the AMR CODEC tolerates bit errors in the Class B and Class C bits, but the speech frame is considered corrupt if there are any errors in the Class A bits. Accordingly, the Class A bits should be sufficiently protected to ensure minimum errors of these bits, and therefore, error correction is applied to Class A bits. On the other hand, B and C bits may not need to be error protected or may require lesser degrees of error protection, and therefore, less redundancy needs to be added to bits in these classes. In other words, there is unequal error protection across the three different classes of bits generated by the AMR CODEC. Thus, while Class A bits receive the benefits of error protection, the classes do not require error protection, or a rigorous error protection scheme, use the radio bandwidth more efficiently.

One transport channel is established over the radio interface per class of bits. For example, a dedicated transport channel DCH A is established for Class A; DCH B for Class B; and DCH C for Class C. Each indicated transport channel is configured in accordance with the characteristics, quality of service, error protection class, or other treatment to be illustrates a configuration of a speech radio access bearer the example of for an AMR CODEC.

TABLE 4

| Transport format | Attribute | RAB | | |
|---|---|---|---|---|
| | | (RB #1) Class A (DCH A) | (RB #2) Class B (DCH B) | (RB #3) Class C (DCH C) |
| Dynamic part | Transport Block Size (each row is a separate transport format combination –> implicit identification of the AMR code rate) | 81 65 75 61 58 55 49 42 39 | 103 99 84 87 76 63 54 53 0 | 60 40 0 0 0 0 0 0 0 |
| Semi-static part | Transport Block Set Size | Same as the transport block sizes | | |
| | Transmission Type Interval | 20 ms | | |
| | Type of channel coding | Convolutional coding | | |
| | Code rates (½: data size doubles ⅓: data size triples) | ½, ⅓ + class-specific rate matching | None, ½, ⅓ + class-specific rate matching | None, ½, ⅓ + class-specific rate matching |
| | CRC size | 8 | 0 | 0 |
| | Resulting ratio after static rate matching | 0.5 to 4 (with no coding the rate matching ratio needs to be >1) | | | supported for a particular class of data. This channel configuration may be implemented by assigning each dedicated transport channel a transport format set (TFS) corresponding to the necessary protection/quality of service for the corresponding class of bits as well as the size of these classes of bits for the various AMR CODEC modes. Although described for an AMR CODEC, the above principles may be applied for other types of CODECs including other speech CODECs, video CODECs, etc.

Figure 13:
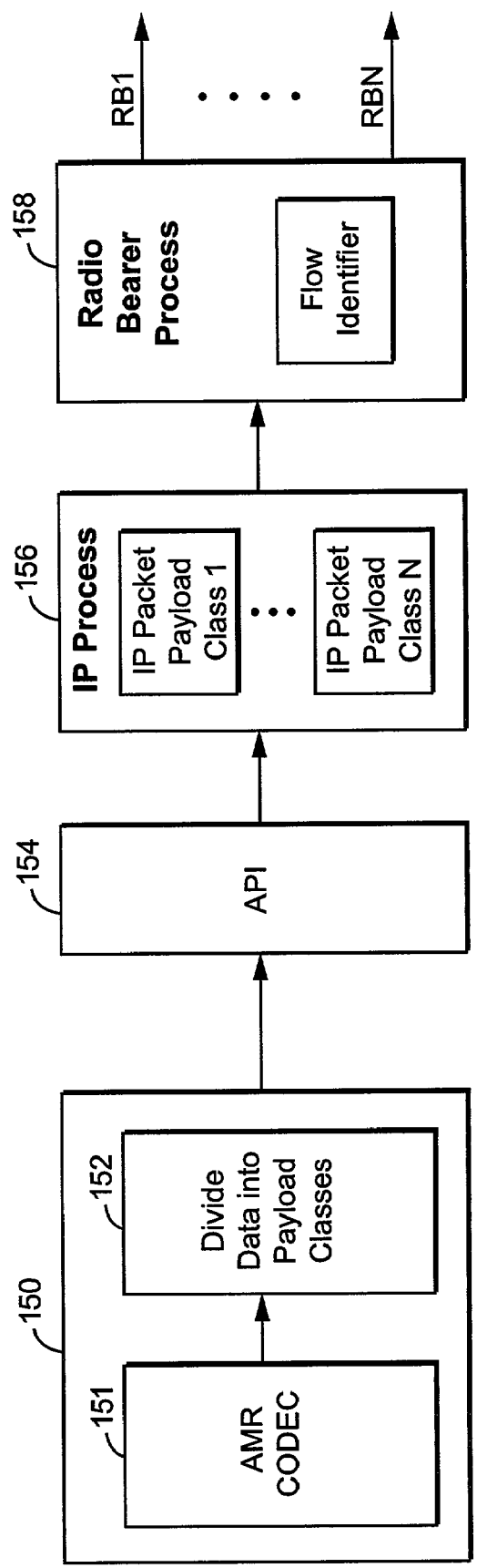
FIG. 13 illustrates an example embodiment of in a user equipment (UE)

Reference is now made to the diagram shown in FIG. 13 which shows a sending user equipment (UE). An application program 150 in the UE uses an AMR CODEC 151 to generate a data frame or "payload" which is divided into different payload classes in block 152. In one example, there may be three different classes, and therefore, the bits would be divided into payload Classes A, B, and C and provided to an application programming interface API 154. Each payload class of data is provided to an IP processing layer 156 which formulates an IP packet to carry the data from each payload class 1–N including a corresponding header for the packet that identifies the particular payload class. The packets are provided to a radio access bearer process 158 where the identifier packets are used to map each packet to a corresponding radio bearer RB1 . . . RBN configured with the appropriate TFS for the identified treatment/class.

As described earlier, it is desirable to (but still optional) compress the headers of each IP packet in order to reduce the amount of bandwidth necessary to transport those headers. Example UMTS-type header compression protocols are described in RFC 2507 and 3095 and reside in the protocol compression entities shown just above the radio link layer in FIG. 10 in the PDCP protocol described at 3GPP TS 25.323. Header compression protocols are selected by the RNC and configured by the UE using radio resource control signaling. Other header compression algorithms may be used.

As described above, each packet must be mapped to a particular and appropriately configured radio bearer. Table 4

As shown in Table 4, Class A transport blocks are protected with an 8 bit CRC (site redundancy check), while Class B and Class C do not have any CRC in this example. The CRC covers the respective transport blocks for each dedicated transport channel. The CRC allows detection of errors in a transport block. Of course, different error protection and/or correction techniques may be employed on any one or more of the different classes.

Thus, the AMR payload information is divided into one or more classes in the sending node with each fragment being transmitted as a separate IP packet with its header identifying the corresponding treatment, quality of service, error protection, etc. Thus, each fragment packet is associated with a quality of service provided by a corresponding radio bearer. The classification of packets and flows with a corresponding mapping of them onto appropriately configured radio bearers is performed at the originating and terminating nodes for the radio access bearers, or at any other node within the UMTS that has the necessary information to perform this task. For example, this information may be located on the RNC rather than at the user equipment. As described above, the fragmentation of the AMR CODEC payload may be performed at the application layer or at the IP layer.

Three non-limiting, example mechanisms may be employed to allow an RAB termination node to identify a packet's treatment/class and map that packet on to the suitable radio bearer. The first example implementation employs an IP version 6 flow label which, as explained above, identifies a flow based on its end-to-end uniqueness between two communicating hosts. An IP version 6 flow label is reserved for each treatment class, and thus, there are three flow labels reserved for Classes A, B, and C for the AMR CODEC. Where fragmentation is performed by the application, the application provides an appropriate one of the three flow labels for each packet via the API. As a result, separate flow label values are provided in each IP packet.

When IP layer fragmentation is used, the application provides the necessary information to the IP stack to allow it to fragment the AMR CODEC payload and assign the necessary values for their flow labels.

Figure 14:
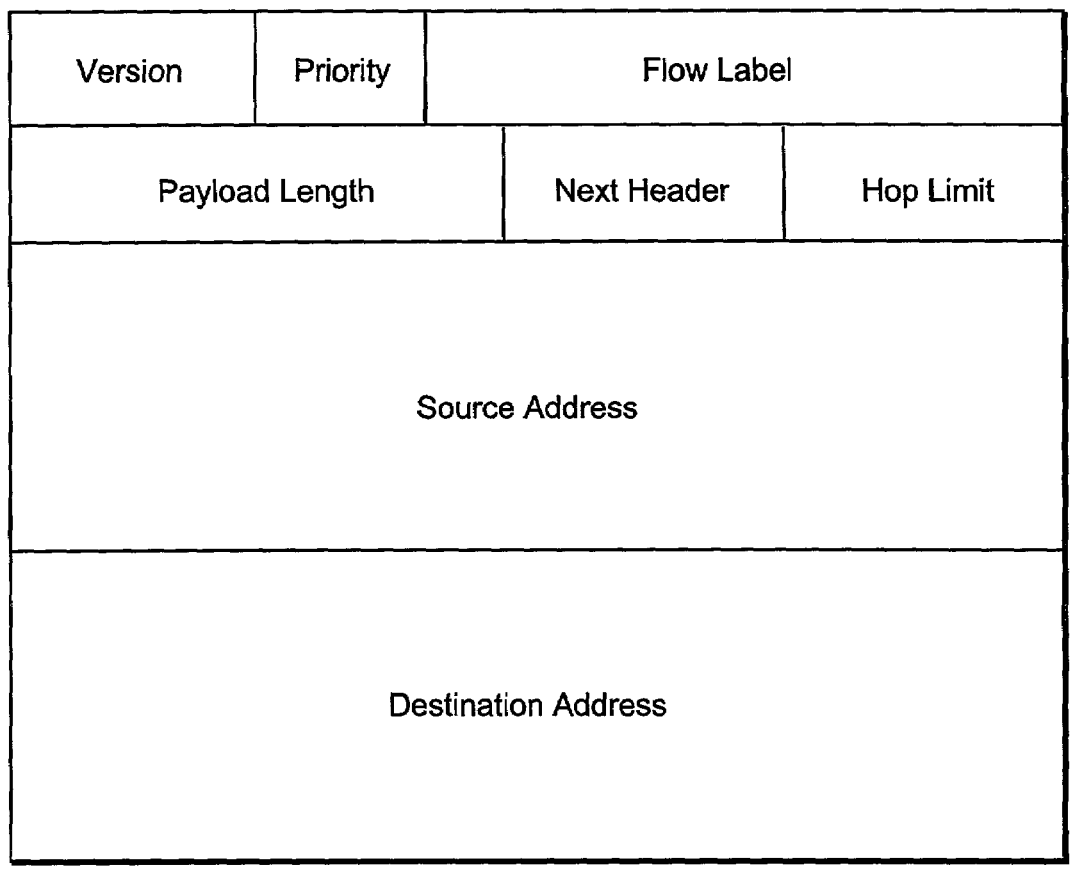
FIG. 14 illustrates an IP version 6 (IPv6) header format.

FIG. 14 illustrates an example IP version 6 header format, the fields of which are defined below:

| | |
|---|---|
| Version | 4-bit Internet Protocol version number = 6 |
| Priority | 4-bit priority value |
| Flow Label | 24-bit flow label |
| Payload Length | 16-bit unsigned integer. Length of payload, i.e., the rest of the packet following the IPv6 header, in octets. If zero, indicates that the payload length is carried in a Jumbo Payload hop-by-hop option. |
| Next Header | 8-bit selector. Identifies the type of header immediately following the IPv6 header. Uses the same values as the Ipv4 Protocol field. |
| Hop Limit | 8-bit unsigned integer. Decremented by 1 by each node that forwards the packet. The packet is discarded if Hop Limit is decremented to zero. |
| Source Address | 128-bit address of the originator of the packet |
| Destination Address | 128-bit address of the intended recipient of the packet (possibly not the ultimate recipient, if a Routing header is present). |

The second example alternative, also described earlier, takes advantage of the fact that IPv6 allows a host to send information to another host encoded as a destination option. Destination options are only processed by end hosts. However, provided that encryption is not used on the IP layer, destination options are also visible to intermediate nodes. The destination option provides the necessary information for an RAB terminating node to identify a packet and its corresponding treatment. The RAB terminating node identifies the payload treatment class from the destination option and maps the packet onto the appropriate radio bearer. The destination option can be defined for application by using the "TYPE" field in the destination option. Alternatively, the "TYPE" field can be used to define a certain category of applications and a separate sub-option can be used per application. There could be several IP streams between the source and destination, each being used by one or more applications, for example, two Internet browsers both using IP to communicate over the Internet. The treatment for each of the applications must be specified if each application has its own requirements. However, a group of applications having similar requirements could be handled in this TYPE field.

Figure 15:
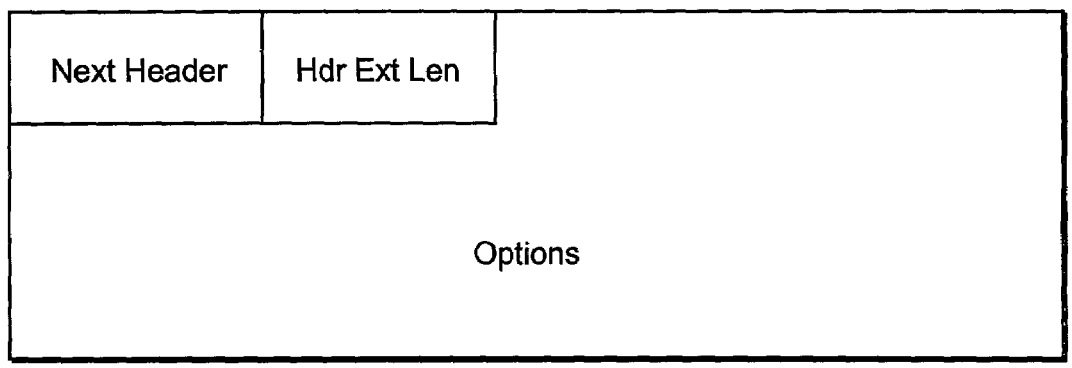
FIG. 15 illustrates an example of a destination option.

FIG. 15 illustrates an example of a destination option the fields of which are defined below:

| | |
|---|---|
| Next Header | 8-bit selector. Identifies the type of header immediately following the Destinations Options header. Uses the same values as the Ipv4 Protocol field [RFC-1700 et seq.] |
| Hdr Ext Len | Header Extension length. 8-bit unsigned integer. Length of the Destination Options header in 8-octet units, not including the first 8 octets. |
| Options | Variable-length field, of length such that the complete Destination Options header is an integral multiple of 8 octets long. Contains one or more TLV-encoded options. The options indicate the subflow, e.g., Class A, B, or C. |

A third alternative, as described earlier, is to identify a flow/packet based on a combination of the packet's source and destination addresses, the transport layer protocol number, and/or port numbers present in the packet's standard IP header. This combination of header information may be signaled to the RAB terminating node, for example, using RSVP or a PDP context in the UMTS to allow it to identify a flow/packet and transmit it on the radio bearer configured with the corresponding treatment/class. The radio access bearer terminating node may so use such information to filter the received IP packets and identify a corresponding flow of that packet. For some services, such as real-time services, an application may run over RTP/UDP/IP. In such a case, the combination of addresses and port numbers may not be sufficient to identify a flow/packet with a suitably configured radio bearer. To ensure the correction identification of a flow, the flow information may be encoded into the RTP header.

Figure 16A:
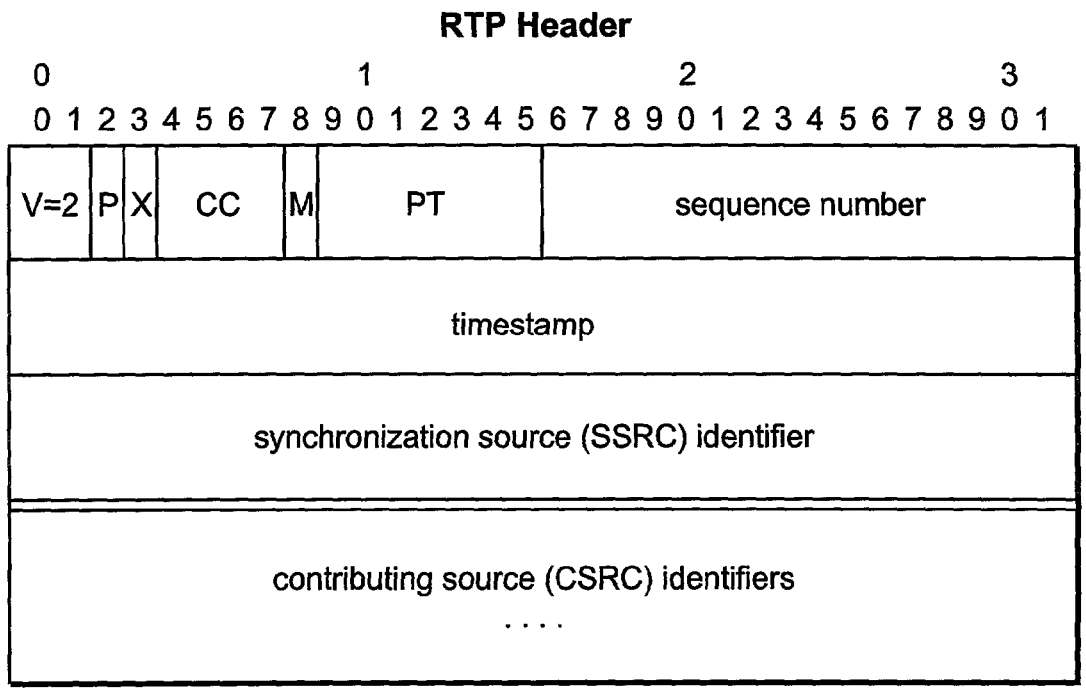
FIGS. 16A–16B illustrate various fields of an RTP header.
Figure 16B:
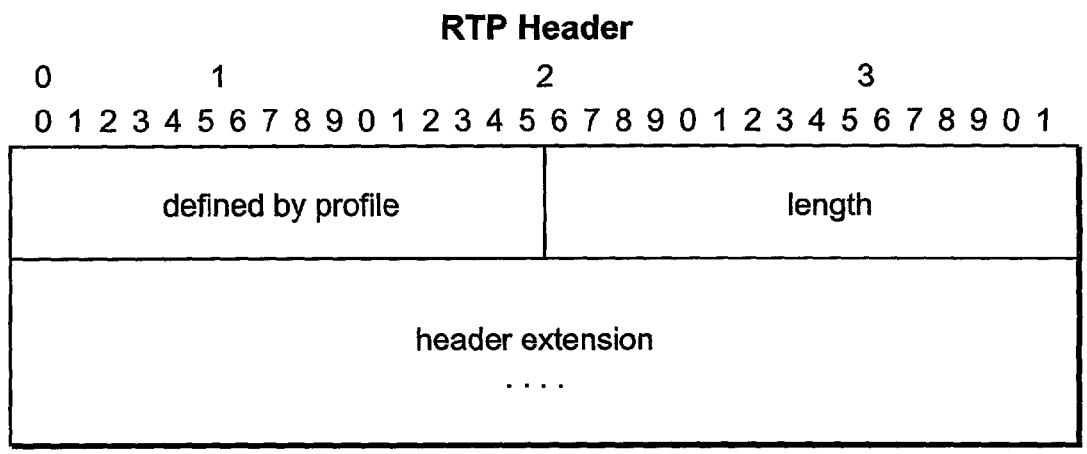

The RTP header may have the format shown in FIG. 16A. The RTP header includes an extension mechanism to allow individual implementations to experiment with new payload format independent functions that require additional information to be carried in the RTP data packet header. The RTP header extension indicates the subflow/radio bearer, e.g., Class A, B, and C. An RTP header extension is shown in FIG. 16B. If the X bit in the RTP header is a "1," a variable-length header extension is appended to the RTP header, following the contributing source (CSRC) identifiers list if present. The header extension contains a 16-bit length field that counts the number of 32-bit words in the extension, excluding the four-octet extension header (therefore zero is a valid length). A single extension may be appended to the RTP data header. To allow multiple interoperating implementations to each experiment independently with different header extensions, or to allow a particular implementation to experiment with more than one type of header extension, the first 16 bits of the header extension are left open for distinguishing identifiers or parameters. The format of these 16 bits is to be defined by the profile specification under which the implementations are operating.

In a UMTS architecture, the UE identifies a flow based on a set of parameters defined in a traffic flow template (TFT) which acts as a packet filter using filter parameters, like IP source/destination address, UDP source/destination address, etc., that are the same for an IP stream. The TFT is mapped to a specific GTP tunnel for which the PDP context was initiated. In the case where an IPv6 the flow label is used for flow identification, the UE initiates one TFT per flow and then maps it to the GTP tunnel. In the RTP header and destination option example implementations, only one TFT for the entire flow need be initiated since these example mechanisms do not modify any of the TFT parameters. Advantageously, introducing information in the IP flow label does not affect the TFT mechanism of directing each flow to the appropriate radio bearer. Although the flow label identify in the IPv6 header has been described here, similar identifiers in an IP packet, including in an IPv4 packet, may be used to indicate the subflows of a particular CODEC stream in order to perform different treatment on those subflows, e.g., a TOS field in the IPv4 header could be redefined.

While the present invention has been described with respect to particular embodiments, those skilled in the art will recognize that the present invention is not limited to these specific exemplary embodiments. Different formats, embodiments, and adaptations besides those shown and described as well as many variations, modifications, and equivalent arrangements may also be used to implement the invention. Therefore, while the present invention has been described in relation to its preferred embodiments, it is to be understood that this disclosure is only illustrative and exemplary of the present invention. Accordingly, it is intended that the invention be limited only by the scope of the claims appended hereto.

What is claimed is:

1. A method for providing different classes of treatment in packet communications, comprising:
    detecting a payload of data to be transmitted from an application;
    dividing the payload of data into a first group of bits associated with a first treatment class and a second group of bits associated with a second treatment class;
    creating a first packet including the first group of bits and a first header that identifies the first packet with the first treatment class;
    creating a second packet including the second group of bits and a second header that identifies the second packet with the second treatment class;
    mapping the first packet to a first communications bearer configured to support the first treatment class using the first header; and
    mapping the second packet to a second communications bearer configured to support the second treatment class using the second header,
    wherein the first and second packets are real time transport protocol (RTP) packets.

2. The method in claim 1, wherein the dividing step occurs at an application processing layer.

3. The method in claim 1, wherein the first and second headers include information that will permit a receiver to reassemble the payload with the first and second packets in a correct sequence.

4. The method in claim 1, wherein the first and second headers are RTP headers including a RTP extension indicating one of the treatment classes, and wherein the mapping of an RTP packet to a corresponding communications bearer is determined using the RTP extension of the RTP packet.

5. The method in claim 1, further comprising:
    compressing the first and second headers.

6. The method in claim 1, wherein the first and second treatments correspond to first and second quality of services.

7. The method in claim 1, wherein the first and second treatments correspond to first and second error protection schemes.

8. For use in a radio communications system, a method for providing different levels of error protection (EP) in packet communications, comprising:
    detecting a data frame to be transmitted from an application;
    dividing the data frame into a first flow of bits associated with a first EP class and a second flow of bits associated with a second EP class;
    creating a first packet for carrying first flow bits and a first header that identifies the first packet with the first EP class;
    creating a second packet for carrying second flow bits and a second header that identifies the second packet with the second EP class;
    mapping the first packet to a first radio bearer configured with a quality of service that supports the first EP class using the first header; and
    mapping the second packet to a second radio bearer configured with a quality of service that supports the second EP class using the second header.

9. The method in claim 8, wherein the data frame is generated by a speech coder-decoder (CODEC) and includes bits for three EP classes, the method further comprising:
    creating a third packet for carrying a third flow of bits and a third header that identifies the third packet with a third EP class;
    mapping the third packet to a third radio bearer configured with a quality of service that supports the third EP class using the third header.

10. The method in claim 9, wherein the dividing step occurs at an application layer.

11. The method in claim 9, wherein the data frame is passed from the application to an Internet Protocol (IP) layer and the dividing step occurs at the IP layer.

12. The method in claim 8, wherein the first and second headers are Internet Protocol headers and each quality of service class has a corresponding flow label, and
    wherein the mapping of a packet to a corresponding radio bearer is determined using a standard IP header field.

13. The method in claim 12, wherein the first and second IP packets are IP version 6 (IPv6) packets and the mapping of each packet to a corresponding radio bearer is determined using the flow label of the IPv6 header.

14. The method in claim 8, wherein the mapping of each packet to a corresponding radio bearer is determined using a combination of source and destination addresses, a transport layer protocol, and a port number in the packet's header.

15. The method in claim 8, wherein the first and second packets are real time transport protocol (RTP) packets and the first and second headers are RTP headers including a RTP extension indicating one of the quality of service classes, and
    wherein the mapping of an RTP packet to a corresponding radio bearer is determined using the RTP extension of the RTP packet.

16. The method in claim 8, wherein the first and second headers are Internet Protocol (IP) headers that each include a destination option field, and wherein the mapping of each packet to a corresponding radio bearer is determined using the destination option of the packet.

17. The method in claim 8, further comprising:
    compressing the first and second headers.

18. The method in claim 17, further comprising:
    receiving the first and second packets;
    decompressing the first and second headers;
    determining from the first and second headers the first and second flows;
    using first and second EP schemes to detect and/or correct errors in the first and second flows; and
    combining the first and second flows into the data frame.

19. Apparatus for transporting data with different classes of treatment, comprising:
    a buffer for buffering a payload of data to be transmitted from an application;
    a divider for dividing the payload of data into a first group of bits associated with a first treatment class and a second group of bits associated with a second treatment class;
    a packetizer for creating a first packet including the first group of bits and a first header that identifies the first packet with the first treatment class and creating a second packet including the second group of bits and a second header that identifies the second packet with the second treatment class;
    a mapper for mapping the first packet to a first communications bearer configured to support the first treatment class using the first header and mapping the second packet to a second communications bearer configured to support the second treatment class using the second header; and a transmitter for transmitting the first and second packets over the first and second communications bearers, respectively, wherein the first and second packets are real time transport protocol (RTP) packets.

20. The apparatus in claim 19, wherein the divider is included in an application layer program.

21. The apparatus in claim 19, wherein the first and second headers include information that will permit a receiver to reassemble the payload with the first and second packets in a correct sequence.

22. The apparatus in claim 19, wherein the first and second headers are RTP headers including a RTP extension indicating one of the treatment classes, and wherein the mapping of an RTP packet to a corresponding communications bearer is determined using the RTP extension of the RTP packet.

23. The apparatus in claim 19, wherein the first and second headers are Internet Protocol (IP) headers that each include a destination option field, and wherein the mapping of each packet to a corresponding communications bearer is determined using the destination option of the packet.

24. The apparatus in claim 19, further comprising:
a data compresser for compressing the first and second headers.

25. The apparatus in claim 19, wherein the first and second treatments correspond to first and second quality of services.

26. Apparatus for transporting data with different classes of treatment, comprising:
a buffer for buffering a payload of data to be transmitted from an application;
a divider for dividing the payload of data into a first group of bits associated with a first treatment class and a second group of bits associated with a second treatment class;
a packetizer for creating a first packet including the first group of bits and a first header that identifies the first packet with the first treatment class and creating a second packet including the second group of bits and a second header that identifies the second packet with the second treatment class;
a mapper for mapping the first packet to a first communications bearer configured to support the first treatment class using the first header and mapping the second packet to a second communications bearer configured to support the second treatment class using the second header; and
a transmitter for transmitting the first and second packets over the first and second communications bearers, respectively,
wherein the first and second treatments correspond to first and second error protection schemes.

27. The apparatus in claim 26, wherein the divider is included in an application layer program and the application layer program provides the first and second packets to an Internet Protocol (IP) layer via an applications programming interface.

28. The apparatus in claim 26, wherein the divider is included in an Internet Protocol (IP) layer program.

29. The apparatus in claim 26, wherein the first and second headers are Internet Protocol (IP) headers and each treatment class has a corresponding flow label, and wherein the mapping of each packet to a corresponding communications bearer is determined using a standard IP header field.

30. The apparatus in claim 29, wherein each IP packet is an IP version 6 (IPv6) packet and the mapping of each packet to a corresponding communications bearer is determined using the flow label of the IPv6 header.

31. For use in a radio communications system, apparatus for providing different levels of error protection (EP) in packet communications, comprising:
means for detecting a data frame to be transmitted from an application;
means for dividing the data frame into a first flow of bits associated with a first EP class and a second flow of bits associated with a second EP class;
means for creating a first packet for carrying first flow bits and a first header that identifies the first packet with the first EP class;
means for creating a second packet for carrying second flow bits and a second header that identifies the second packet with the second EP class;
means for mapping the first packet to a first radio bearer configured with a quality of service that supports the first EP class using the first header, and means for mapping the second packet to a second radio bearer configured with a quality of service that supports the second EP class using the second header.

32. The apparatus in claim 31, wherein the data frame is generated by a speech coder-decoder (CODEC) and includes bits for three EP classes, the apparatus further comprising:
means for creating a third packet for carrying a third flow of bits and a third header that identifies the third packet with a third EP class;
means for mapping the third packet to a third radio bearer configured with a quality of service that supports the third EP class using the third header.

33. The apparatus in claim 32, wherein the dividing step occurs at an application layer.

34. The apparatus in claim 32, wherein the data frame is passed from the application to an Internet Protocol (IP) layer and the dividing step occurs at the IP layer.

35. The apparatus in claim 31, wherein the first and second headers are Internet Protocol (IP) headers and each quality of service class has a corresponding flow label, and
wherein the mapping of each packet to a corresponding radio bearer is determined using a standard IP header field.

36. The apparatus in claim 31, wherein each IP packet is an IP version 6(IPv6) packet and the mapping of each packet to a corresponding radio bearer is determined using the flow label of the IPv6 header.

37. The apparatus in claim 31, wherein the first and second packets are real time transport protocol (RTP) packets and the first and second headers are RTP headers including a RTP extension indicating one of the quality of service classes, and
wherein the mapping of an RTP packet to a corresponding radio bearer is determined using the RTP extension of the RTP packet.

38. The apparatus in claim 31, wherein the first and second headers are Internet Protocol (IP) headers that each include a destination option field, and wherein the mapping of each packet to a corresponding radio bearer is determined using the destination option of the packet.

39. The apparatus in claim 31, further comprising:
means for compressing the first and second headers.

* * * * *